United States Patent
Graham et al.

(10) Patent No.: US 10,548,256 B2
(45) Date of Patent: Feb. 4, 2020

(54) PRECISION AGRICULTURAL-DEVICE CONTROL SYSTEM AND WIRELESS AGRICULTURAL-DEVICE COMMUNICATION PROTOCOL

(71) Applicant: Graham Equipment, LLC, Sterling, CO (US)

(72) Inventors: Jerry Graham, Wray, CO (US); Paul Zoric, Westminster, CO (US); John Videtich, Zeeland, MI (US); Warren Guthrie, West Olive, MI (US)

(73) Assignee: Graham Equipment, LLC, Sterling, CO (US)

( * ) Notice: Subject to any disclaimer, the term of this patent is extended or adjusted under 35 U.S.C. 154(b) by 261 days.

(21) Appl. No.: 15/250,705

(22) Filed: Aug. 29, 2016

(65) Prior Publication Data

US 2017/0055432 A1    Mar. 2, 2017

Related U.S. Application Data

(60) Provisional application No. 62/211,184, filed on Aug. 28, 2015.

(51) Int. Cl.
*A01B 79/00* (2006.01)
*A01C 7/10* (2006.01)
*G01M 17/00* (2006.01)
*A01C 21/00* (2006.01)

(52) U.S. Cl.
CPC .......... *A01B 79/005* (2013.01); *A01C 21/005* (2013.01)

(58) Field of Classification Search
CPC ..... A01B 79/005; A01B 79/00; A01C 21/005; A01C 7/102; A01C 7/087; A01C 7/02; A01C 7/04; A01C 5/008; A01C 7/10; A01C 15/00; G06K 7/10366; G06K 7/10; G01S 5/14; G01S 9/56; G08C 17/02; G01M 17/00

See application file for complete search history.

(56) References Cited

U.S. PATENT DOCUMENTS

| 4,083,047 A * | 4/1978 | Schalow ................ G01S 5/14 342/135 |
| 6,920,171 B2 | 7/2005 | Souissi et al. |
| 7,591,226 B2 * | 9/2009 | Dix .................. A01C 7/087 111/200 |
| 2004/0059737 A1 | 3/2004 | Beck et al. |

(Continued)

OTHER PUBLICATIONS

ZigBee communication protocols; Sep. 28, 2016; https://en.wikipedia.org/wiki/ZigBee.

*Primary Examiner* — Yuri Kan
(74) *Attorney, Agent, or Firm* — Spencer Fane LLP

(57) ABSTRACT

The present invention provides a precision agricultural-device control system for controlling agricultural implements (such as seed feeders and fertilizer sprayers) or on a line planter. More particularly, a command and control module is provided that is in communication with an interface module and provides commands in accordance with a field prescription. The interface module wirelessly transmits command messages to the agricultural implements or and receives monitoring messages from the agricultural implements. In certain embodiments, a novel, low latency and high reliability wireless protocol or using repeats is used to communicate wirelessly with the agricultural implements.

16 Claims, 12 Drawing Sheets

(56) References Cited

U.S. PATENT DOCUMENTS

| | | | |
|---|---|---|---|
| 2007/0038346 A1* | 2/2007 | Ehrlich | G07C 5/008 701/31.4 |
| 2010/0238890 A1 | 9/2010 | Mo et al. | |
| 2013/0162442 A1* | 6/2013 | Honda | G08C 17/02 340/870.02 |
| 2015/0130593 A1* | 5/2015 | Mats | G06K 7/10366 340/10.1 |
| 2015/0134210 A1* | 5/2015 | Steffen | A01C 21/005 701/50 |
| 2015/0223390 A1* | 8/2015 | Wendte | A01C 7/04 111/177 |
| 2016/0219781 A1* | 8/2016 | Henry | A01C 7/102 |
| 2016/0302353 A1* | 10/2016 | Wendte | A01C 21/005 |

\* cited by examiner

PRECISION AGRICULTURAL-DEVICE CONTROL SYSTEM AND WIRELESS AGRICULTURAL-DEVICE COMMUNICATION PROTOCOL

CROSS-REFERENCE TO RELATED APPLICATIONS

This application claims priority to U.S. Provisional application No. 62/211,184, filed Aug. 28, 2015, entitled "Modular Planter and Peripheral Control System for Improved Precision Farming," which is herein incorporated by reference in its entirety.

FIELD OF THE INVENTION

The present invention relates generally to agricultural systems. More particularly, the present invention relates to a precision agricultural-device control system for use with a line or row planter to control precision application of seed, fertilizer, and other chemicals, among other things.

BACKGROUND

The success of modern agriculture is based on continuously improving the use of resources including, e.g., seed, fertilizer, chemicals, and land. Improvements result in lower costs of production as well as improved crop yield. Crop yield is highly dependent on the density of seeds (population) and costs are highly dependent on application rates of fertilizer, chemicals, and water. So, profit from a crop can be maximized by carefully controlling both of those factors.

Precision planting refers to controlling seed population (e.g., how many seeds per square foot) based on soil and environmental conditions. In a precision planting system, the seed density is adjusted according to a priori prescriptions developed by an agronomist. In addition to optimizing seed population, it is possible to further optimize the yields with similar precision application of fertilizer and other chemicals. Exact seed-by-seed adjustment of population as well as fertilizer application is ideal.

Conventional seed planting and fertilizing equipment include line or row planters that are pulled across fields by tractors. Line planters may be hundreds of feet across and include hundreds of individual agricultural implements (or depositing devices), such as seed dispensers, fertilizer or chemical sprayers, trash clearers, depth controllers, seed counters, and the like. Line planters are large and complex metal machinery pulled at relatively high speeds. This results in increased stress and wear-and-tear on components of a line planter so that wiring becomes prone to breakdown. Further, such conventional line planters lack precision control systems for, inter alia, precision application of seed, fertilizer, and chemicals within a section or on a row-by-row basis.

Another problem with such conventional line planters is latency. If a malfunction occurs, such as a seed dispenser failing, the operator may not become aware of the problem for several seconds if not longer. During that time, the tractor and the line planter may have traveled, thus leaving a long stretch of the field unplanted.

Accordingly, there is a need for a precision agricultural control system for precision application of seed, fertilizer, and chemicals, among other things. There further is a need for such a precision agricultural control system to operate without wiring, which is costly and susceptible to damage in the harsh environment of a line planter. Accordingly, there is a need for such a precision agricultural control system communicate wirelessly, yet be robust enough to permit communication at distance and in an environment with interference from metal and other components of the line planter. There still further is a need for the precision agricultural control system to be able to control the precision application based on precise location being planted.

SUMMARY

Accordingly, it is an object of the present invention to provide an agricultural control system.

A command and control module, an interface module, and a plurality of remote modules. The command and control module comprises a user interface adapted to receive a field prescription, a positioning device adapted to determine positioning information, an agricultural-calculation engine adapted to receive a field prescription and adapted to generate control commands for one or more of the plurality of remote modules based on the field prescription and the positioning information, and a first transceiver adapted to transmit the control commands. The interface module comprises a second transceiver adapted to receive the control commands, a first processor coupled to the second transceiver, the first processor adapted to generate command messages based on the control commands, and a third transceiver coupled to the first processor, the third transceiver adapted to wirelessly transmit command messages the plurality of remote modules. The plurality of remote modules each comprises a fourth transceiver adapted to selectively receive the command messages designated for the remote module and adapted to retransmit command messages if the remote module has been provisioned as a repeater node, a second processor adapted to generate a control signal to an agricultural implement based on the command messages that are designated for the remote module.

In other embodiments, the second processor is adapted to receive a monitoring signal from an agricultural implement and generate a monitoring message; and the fourth transceiver is adapted to wirelessly transmit the monitoring message to the interface device.

In other embodiments, the plurality of remote modules are assigned to a plurality of slave groups. In yet other embodiments, each of the remote modules assigned to the same slave group transmit and receive on the same channel, but on a different channel from the remote devices assigned to another slave group.

In other embodiments, the fourth transceiver of each of the plurality of remote modules is further adapted to receive retransmitted command messages from another remote device assigned to the same slave group.

In other embodiments, each of the plurality of remote modules is further adapted to receive monitoring messages from another remote device and retransmit the received monitoring messages if the remote module is designated as a repeater node.

In other embodiments, the wireless agricultural-device control system of claim 1 further comprises a tractor having a cab. The command and control module is installed in the cab. The interface module is installed in a location remote from the command and control module. A line planter comprising a plurality of agricultural implements is provided. Each of the plurality remote modules is communicatively couple to at least one of the plurality of agricultural implements. Each of the plurality of agricultural implements is adapted to receive a control signal from the remote module to which it is communicatively coupled.

In certain embodiments, the command and control module communicates with the interface module using Bluetooth. In other embodiments, the command and control module communicates with the interface module using CAN-BUS.

In still other embodiments, the interface module communicates with the plurality of remote modules using a 802.15.4 physical layer protocol.

In certain embodiments, the interface module communicates with the plurality of remote modules using the protocol shown in FIG. 8. In other embodiments, the interface module communicates with the plurality of remote modules using the protocol shown in FIGS. 10 and 10A.

In yet another embodiment, a method for wireless communication with agricultural implements is provided. The method comprises the steps of determining a first command message for a first agricultural implement based on a field prescription and a location. A second command message for a second agricultural implement based on a field prescription and a location is determined. The first command message is wirelessly transmitted on a first channel to a first set of remote modules during a first time slot. The first command message is wirelessly retransmitted by a first remote module of the first set of remote modules on the first channel during a second time slot. The second command message is wirelessly transmitted on a second channel to a second set of remote modules during the second time slot. A first control signal is output to the first agricultural implement by a second remote module of the first set of remote modules based on receiving the first command message. A second control signal is output to the second agricultural implement by a third remote module of the second set of remote modules based on receiving the second command message;

In an alternate embodiment of the method, the second remote module receives a monitoring signal from the first agricultural implement. The second remote module generates a first monitoring message. The second remote module wirelessly transmitting the first monitoring message on the first channel during a third time slot.

In yet another embodiment of the method, the first remote module receives the first monitoring message and wirelessly retransmits the first monitoring message on the first channel during a fourth time slot.

There has thus been outlined, rather broadly, certain embodiments of the invention in order that the Detailed Description thereof herein may be better understood, an in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

BRIEF DESCRIPTION OF THE DRAWINGS

Further features of the present invention will become apparent to those skilled in the art to which the present invention relates from reading the following description with reference to the accompanying drawings, in which.

DETAILED DESCRIPTION

Figure 1:
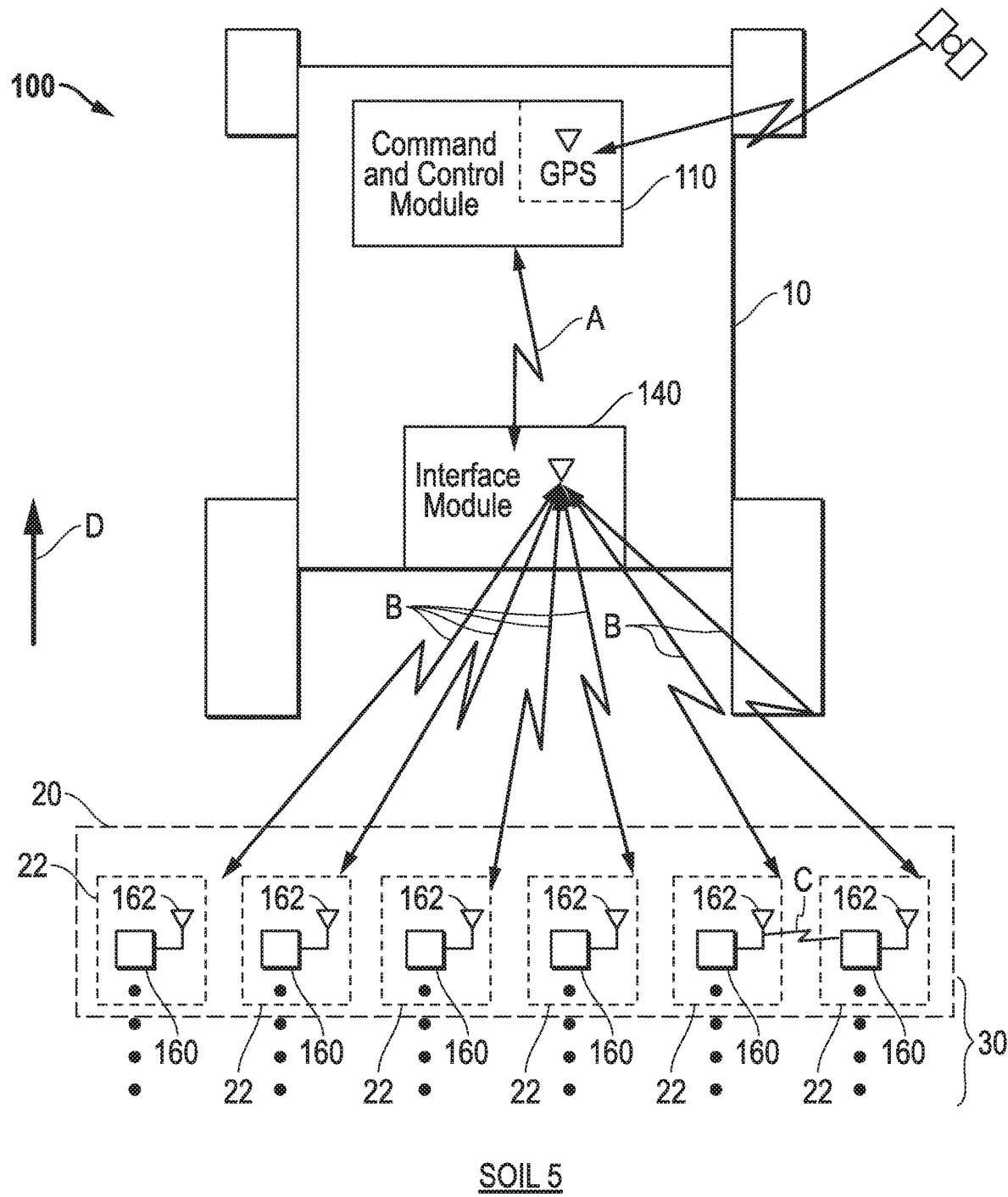
FIG. 1 is a plan view of a precision agricultural control system 100 in accordance with a preferred embodiment of the present invention exemplified being deployed in a tractor 10 and a line planter 20 operating over soil 5.

The invention will now be described with reference to the drawing figures, in which like reference numerals refer to like parts throughout. For purposes of clarity in illustrating the characteristics of the present invention, proportional relationships of the elements have not been maintained in the Figures. In some cases, the sizes of certain small components have been exaggerated for illustration.

Figure 2:
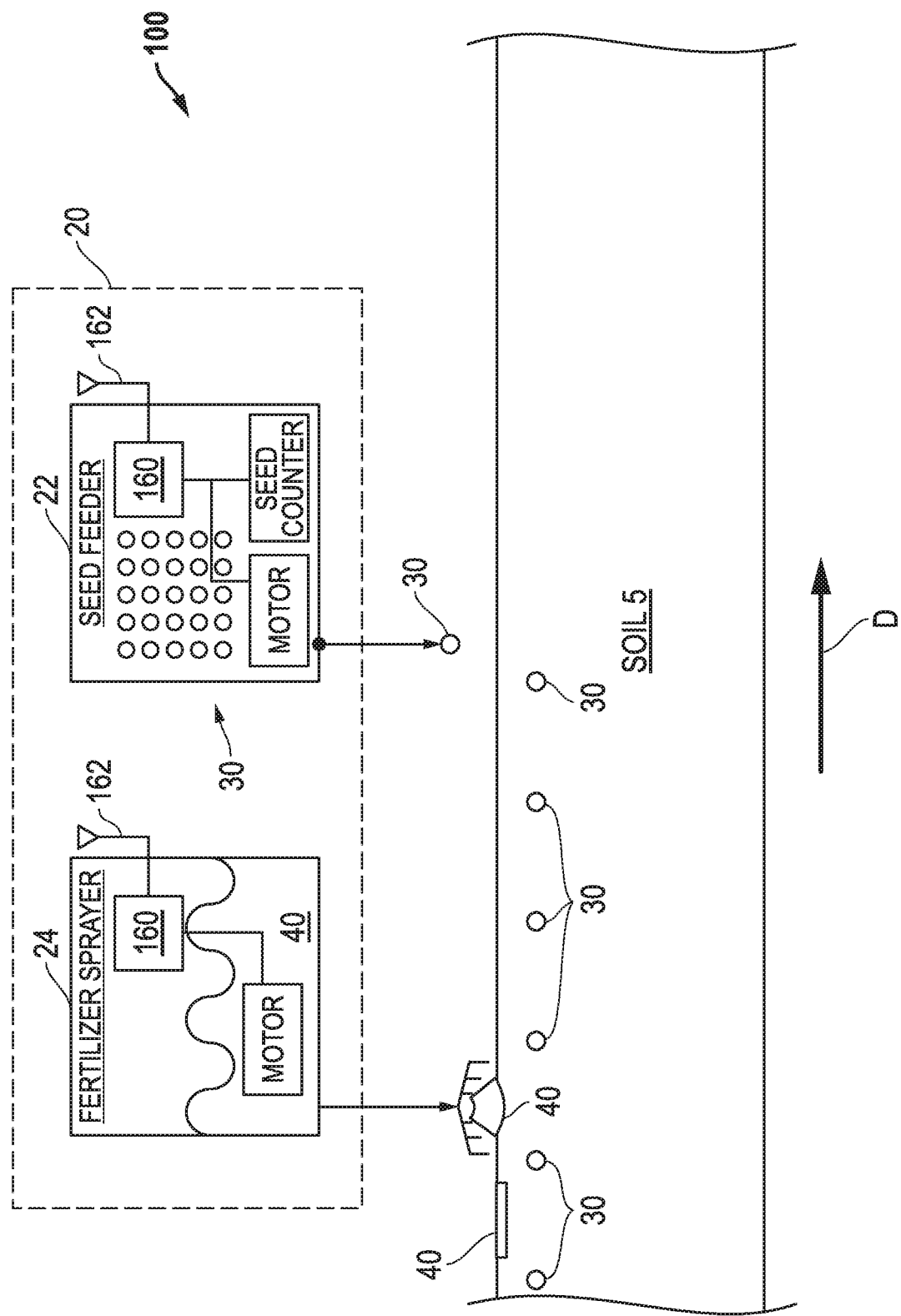
FIG. 2 is a side view of the precision agricultural control system 100 exemplified controlling agricultural implements 22 (motorized planter) and 24 (rate controllable liquid fertilizer sprayer) of the line planter 22.
Figure 3:
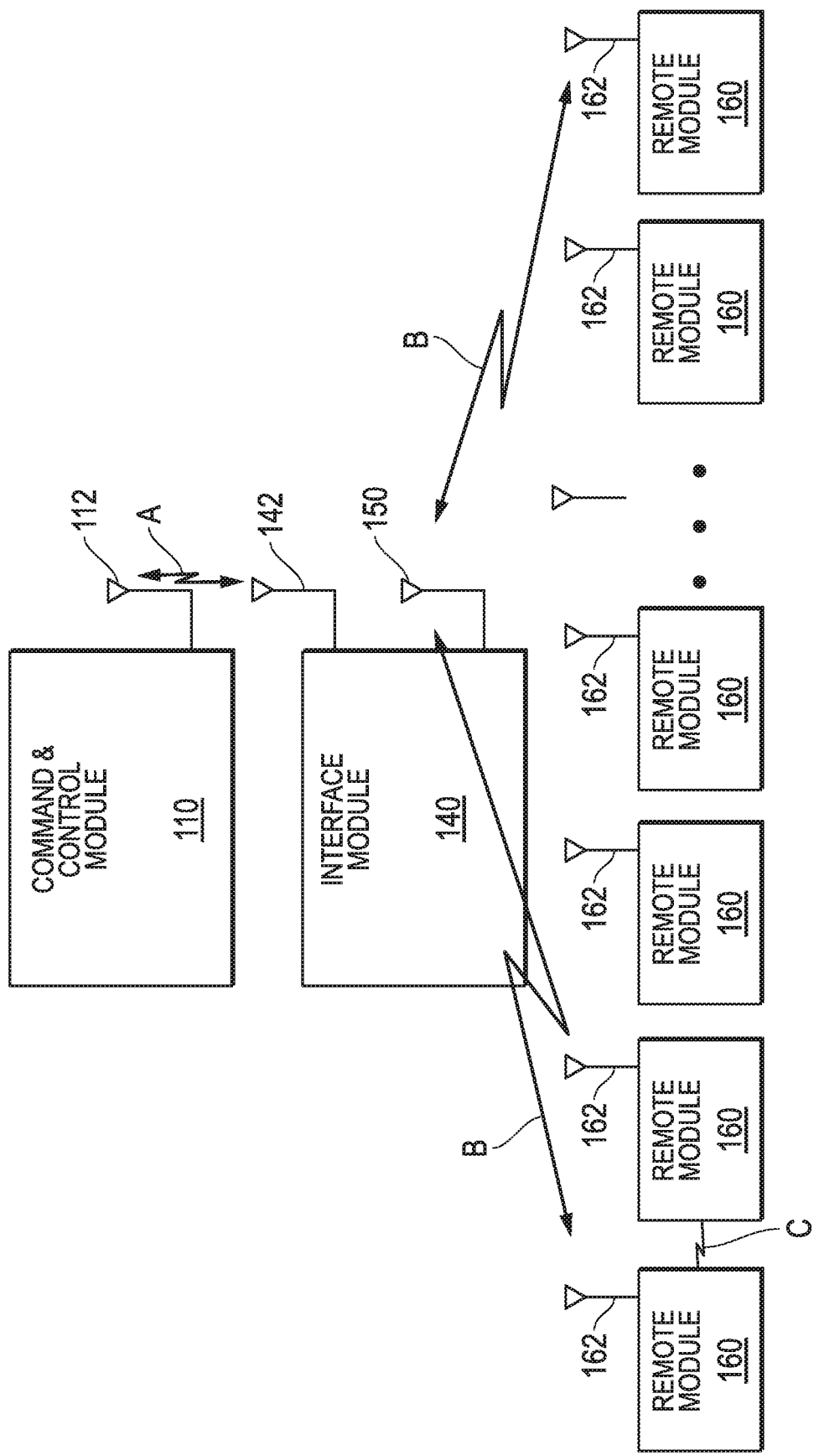
FIG. 3 is a schematic diagram of the precision agricultural control system 100.
Figure 7:
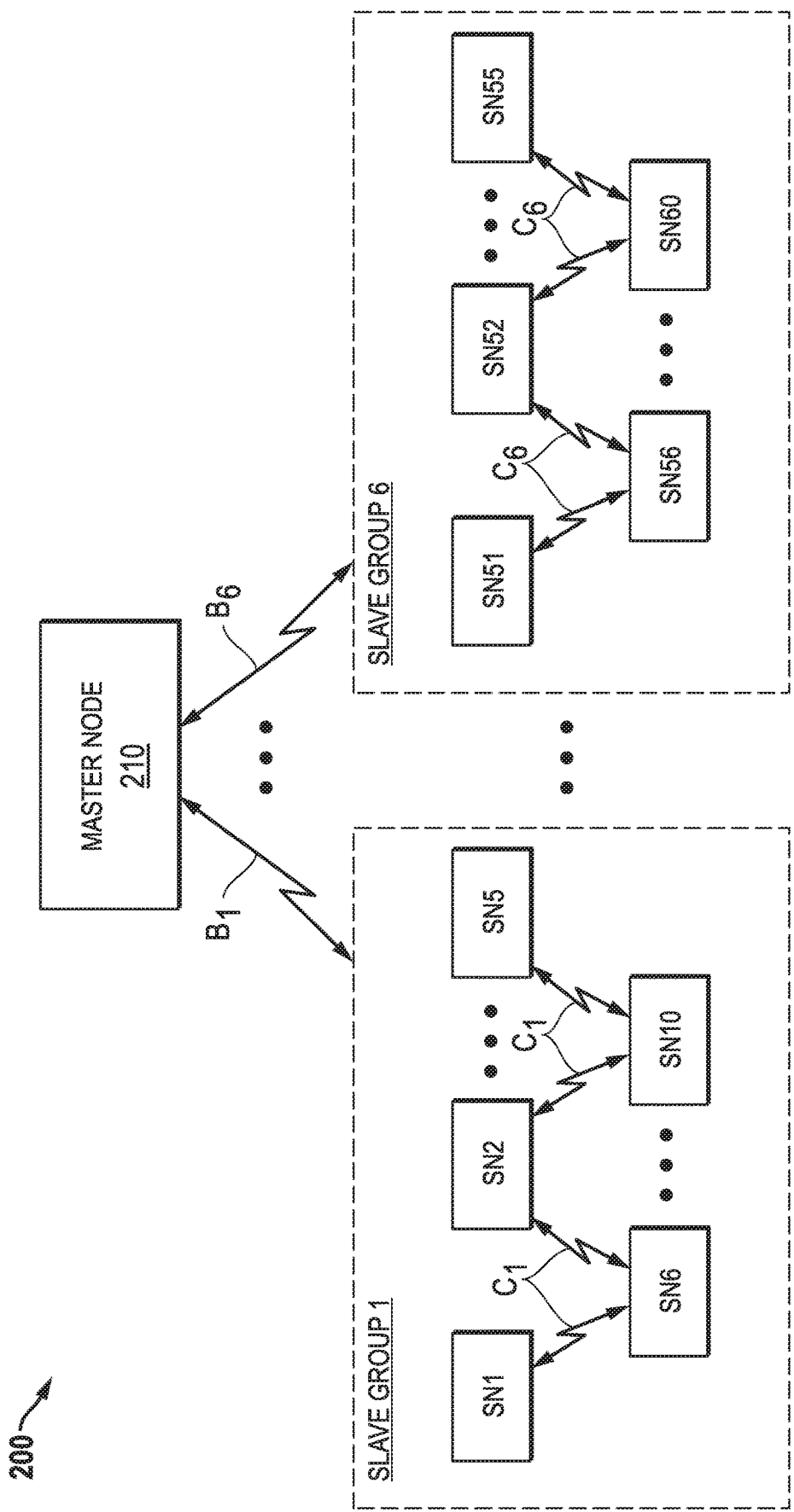
FIG. 7 is a schematic diagram of a preferred wireless agricultural-device communication (WADC) protocol 200 used by the precision agricultural control system 100 in accordance with aspects of the present invention.

Referring to FIGS. 1-3, a precision agricultural control system 100 in accordance with a preferred embodiment of the present invention is exemplified being deployed in a tractor 10 and a line planter 20 operating over soil 5. The tractor 10 tows the line planter 20 in direction D (see FIG. 1). As the line planter 20 travels over soil 5, agricultural implements 22 (exemplified as a seed planter) plant seeds 30 as shown. In other embodiments, the line planter 20 also includes agricultural implements 24, exemplified as a rate controllable fertilizer sprayer, for depositing or spraying fertilizer 40 or other chemicals (see FIG. 2). The term agricultural implement as used herein also includes seed dispensers, depth controllers, trash clearers, wet fertilizer sprayers, dry fertilizer dispensers, moisture meters, down-force controllers, lift-gate monitors, position gauges, and similar agricultural devices. FIG. 1-3 have been simplified for clarity omits certain features such as fertilizer sprayer 24 (FIG. 3) and relay channel C (FIG. 7).

The precision agricultural control system 100 comprises a command and control module 110, an interface module 140, and a plurality of remote modules 160. The command and control module 110 communicates with the interface module 150 over communication channel A, which is preferably a wireless communication channel such Bluetooth®. In alternate embodiments, channel A may comprise a wired link, such as a control area network (e.g., CAN-BUS). The interface module 150 communicates with the remote modules 160 over communication channel B, which is preferably a wireless channel operating in accordance with a novel wireless agricultural-device communication (WADC) protocol as discussed in more detail below.

Figure 4:
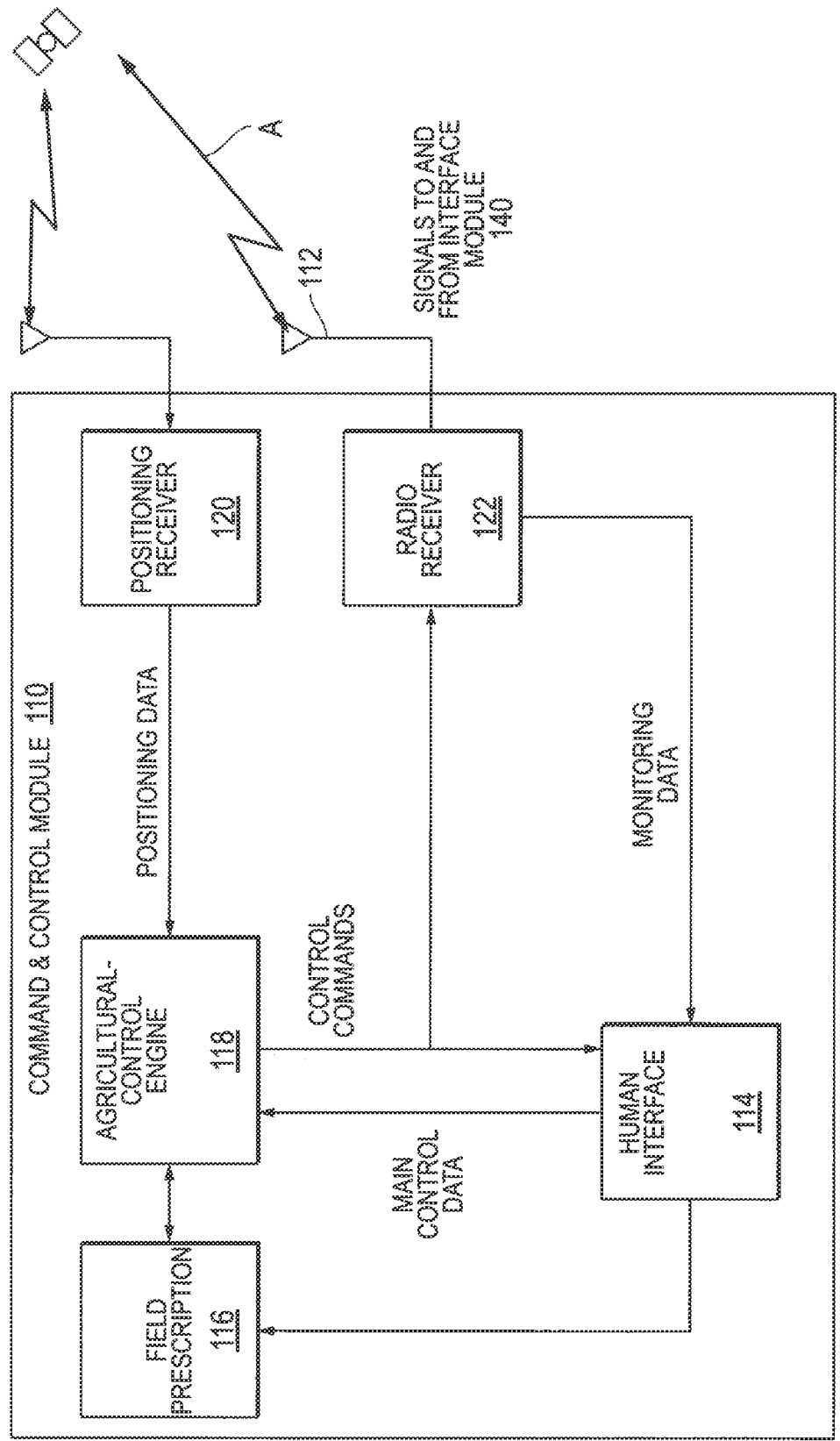
FIG. 4 is a schematic diagram of a preferred command and control module 110 of the precision agricultural control system 100 in accordance with aspects of the present invention.

Referring to FIG. 4, a preferred embodiment of the command and control module 110 is provided. A user interface 114 is provided for displaying information and receiving user input. The user interface also allows a user or operator to verify that the system 100 is operating acceptably and to allow for manual intervention as needed. The user interface 114 also allows the operator to provide a field prescription 116, which may be provide via Wi-Fi, USB, manual input, or other means. The field prescription 116 generally dictates the precision planting plan (e.g., seed and fertilizer amounts and locations) for a field to be planted.

An agricultural-calculation engine 118 is provided for calculating control commands for the agricultural implements 22 and/or 24 and dictate application rates for seed, fertilizer, and the like. A positioning receiver 120, such a GPS receiver, is provided for receiving and determining positioning data such as present location, speed, orientation (or heading), etc. Optionally, the positioning receiver 120 may be coupled to an antenna 121 for improved accuracy. The positioning receiver provides positioning data to the agricultural-calculation engine 118. In the preferred embodiment, the agricultural-calculation engine 118 determines, based on the field prescription and positioning data, control commands for each of the agricultural implements 24. In other embodiments, control commands may be determined for groups or sets of agricultural implements 22 or 24. In preferred embodiment, control commands are for an individual agricultural implement 22 or 24. The agricultural-calculation engine 118 provides the control commands to a radio transceiver 122, which transmits the commands via antenna 112. The radio transceiver 122 is in wireless communication with the interface module 140 over wireless channel A. The radio transceiver 122 is preferably a Bluetooth® transceiver. The radio transceiver 112 also receives monitoring data from the interface module (such as malfunctions or errors), which may be passed to the user interface 114 for display and are also used by the agricultural-calculation engine 118.

The command and control module 110 is preferably implemented using tablet computer and preferably located in a tractor's cab. In alternative embodiments, other computing devices, such as a laptop or mobile phone, may be used to implement the command and control module 110 (e.g., by installing a specialized application). In still yet other embodiments, third party consoles for controlling agricultural-devices may be used to interface directly with the interface module 140, thereby a separate command and control module may be omitted.

Figure 5:
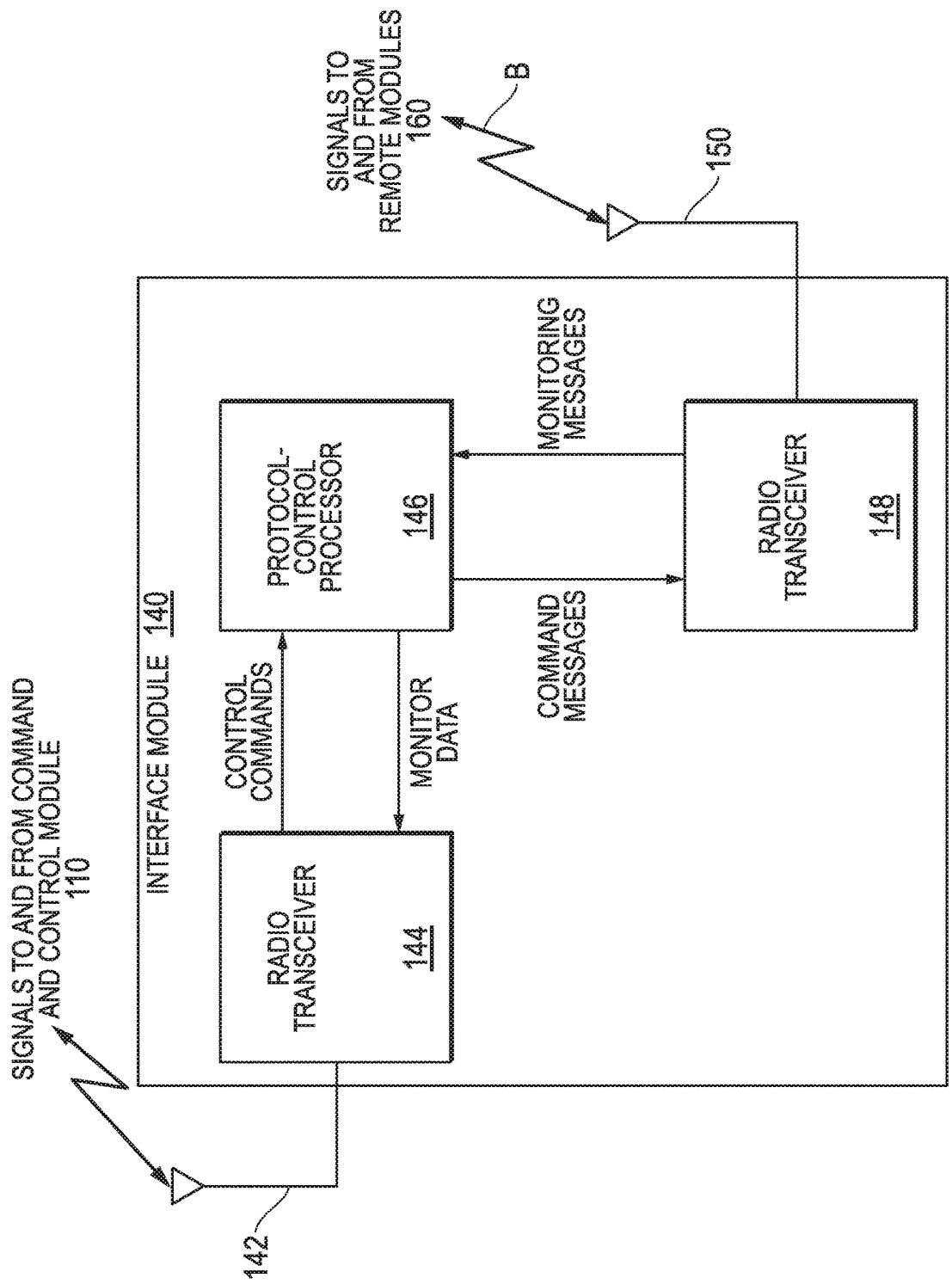
FIG. 5 is a schematic diagram of a preferred interface module 140 of the precision agricultural control system 100 in accordance with aspects of the present invention.

Referring now to FIG. 5, a preferred embodiment of the interface module 140 is provided. A radio transceiver 144 includes antenna 142 for receiving the control commands and transmitting the monitoring data to and from the command and control module 110 over channel A. The radio transceiver 142 is preferably a Bluetooth® transceiver. Control commands are passed to a protocol-control processor 146. Based on the received control commands, the protocol-control processor 146 generates command messages. The command messages are provided to a radio transceiver 148. The radio transceiver 148 transmits the command messages via antenna 150 to the remote device 160 over channel B. The radio transceiver 148 also receives monitoring messages from the remote devices 160, from which monitoring data is extracted by the protocol-control processor 146 and transmitted to the command and control module by the radio transceiver 144. The preferred embodiments for the messages and protocol for channel B are discussed below.

Figure 6:
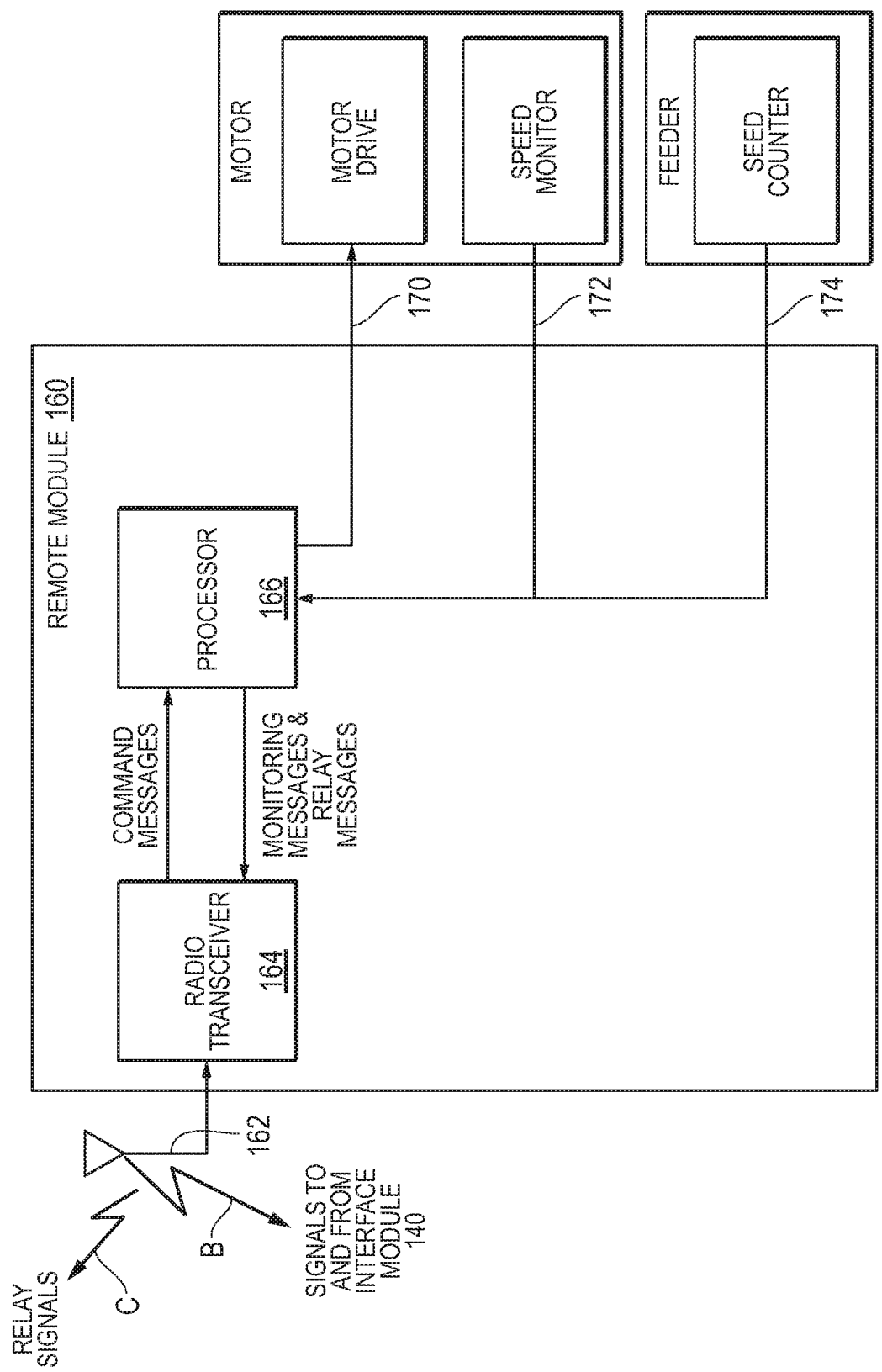
FIG. 6 is a schematic diagram of a preferred remote module 160 of the precision agricultural control system 100 in accordance with aspects of the present invention.

Referring now to FIG. 6, a preferred embodiment of the remote module 160 is provided. The remote modules 160 are each adapted for deployment at an individual agricultural implements 22 or 24 (e.g., a seed planter or fertilizer sprayer) and control the agricultural implement (e.g., its motor or valves) and also receive monitoring data from the agricultural implement (e.g., speed and seed count). A radio transceiver 164 is coupled to antenna 162 and receives the command messages from, and transmits monitoring messages to, the interface device 140. A processor 166 is provided for converting the control messages into a control signal 170 that controls an agricultural implement 22 (exemplified in FIG. 6 as a signal for a motor drive of a seed planting device). In other embodiments, the control signal 170 may control a fertilizer sprayer 24 as shown in FIG. 2. In yet other embodiments, other agricultural apparatuses, such as depth controllers and trash clearers, are controlled. The processor 166 receives monitoring signals 172 and 174 from the agricultural implement 22 (exemplified in FIG. 6 as signals for speed and seed count). The processor 166 converts the monitoring signals to monitoring data, which is included in a monitoring message and transmitted to the interface module 140 by the transceiver 164.

In yet other embodiments, the remote module is adapted to provide a closed-loop control, which is advantageous for controlling certain motors that require closed-loop control to maintain predictable speed and acceleration. In this embodiment, the remote module includes a closed-loop control function that adjusts the motor-control voltage or digital commands according to the motor speed feedback received from the motor. Preferably, this is done with a proportional and integral gain stage.

A preferred embodiment of the WADC protocol 200 for communication between the interface module 140 and the remote modules is now discussed with reference to FIGS. 7 & 8. The WADC protocol 200 comprises a physical (PHY) transport layer and a media access control (MAC) layer. In the preferred embodiment, the PHY layer operates in accordance with IEEE 802.15.4 Standard. However, the present invention is not limited to IEEE 802.15.4 and other PHY layers may be used. In the preferred embodiment, the WADC protocol employs a specialized MAC layer as discussed herein.

Referring more specifically to FIG. 7, the interface device 140 constitutes a master node 210, in the embodiment shown there is a single master node. The remote devices 160 constitute slave nodes. This embodiment as shown is exemplified having 60 slave nodes (SN1 to SN60), however in other embodiments there may be more or less. The slave nodes are exemplified grouped into six slave groups (Slave Group 1 to Slave Group 6) each comprising 10 slave nodes.

Each slave group is assigned a separate main channel ($B_1$ to $B_6$) for communication with the master node 210. Each slave node within the same slave group communicates with the master node on the same primary channel. For example, Slave Group 1 is assigned main channel $B_1$ and thus SN1 to SN10 communicate on main channel $B_1$. While, Slave Group 6 is assigned main channel $B_6$ and thus SN51 to SN60 communicate on main channel $B_6$. In the preferred embodiment, each main channel B is divided by frequency. But, the present invention is not limited to frequency division, and other techniques, such as code division, may be used.

Within each slave group, certain slave nodes are designated as repeater nodes. A repeater node retransmits communications received from the master node to improve reliability. Thus, as exemplified in FIG. 7, SN1 to SN5 are designated as repeater nodes and retransmit each message received from the master node in relay channel $C_1$. These retransmitted messages are also referred to as relay messages. Each relay channel operates on the same frequency as the assigned master channel for the slave group, but operates in a different time slot (see FIG. 8). If a designated repeater node does not receive a command message from the master node in its assigned time slot, then that repeater node would listen in relay channel for a relay message from one of the other repeater nodes within the same slave group.

Initially, the master and slave nodes are configured through a provisioning mode, which may be manually, activated using preferably a magnetic reed switch. In this mode, a wireless signal is sent on a provisioning channel (not shown) and various state properties are set as shown in Tables I and II.

TABLE I

Master Node Provisioning Variables

| Function | Range (Bits) | Comments | Variable (in code) |
|---|---|---|---|
| Message ID | 0-255 (8) | Initialize message ID | msgId |
| Row ID | 0-59 (8) | Which row to initialize | destDeviceId |
| Designated Channel | 11-25 (8) | Radio Frequency is 2405 + 5 × (channel number-11) MHz | channel |
| Designated repeater | 0-1 (1) | Is module a repeater | Repeater |
| Repeater timeslot | 0-4 (6) | Which repeater if any | rptTimeSlot |
| Repeated message? | 0-1 (1) | 1 means message is a repeat | repeatMsg |
| Designated data slot | 0-10 (8) | Which data slot in forward link communication message | dataSlot |
| Module-specific configuration data | 10 bytes (80) | Module-specific configuration data, i.e. motor encoder count, seed counter control, fertilizer solenoid output frequency, etc. | dat |

TABLE II

Slave Node Provisioning Variables

| Function | Range (Bits) | Comments | Variable (in code) |
|---|---|---|---|
| Command ID | 0-255 (8) | Message ID (RFCMD_PROVISION) | Cmd |
| Module type | 0-255 (8) | Which type of module (row motor, fertilizer controller, etc.) | modType |
| Channel | 11-25 (8) | Radio Frequency is 2405 + 5 (channel number-11) MHz | Channel |
| Node ID | 0-255 (8) | Row number/module ID in system | rowNum |
| System ID | 1-16,777,214 (24) | Radio hardware blocks any other messages | sysId |

Typically provisioning will only need to be done once at the manufacturer. However, provisioning may be repeated in the field, for example, if a remote module is replaced.

The master node cycles through all of the channels. Signal synchronization is preferably controlled by the master node by transmitting on each channel every 60 milliseconds.

Figure 8:
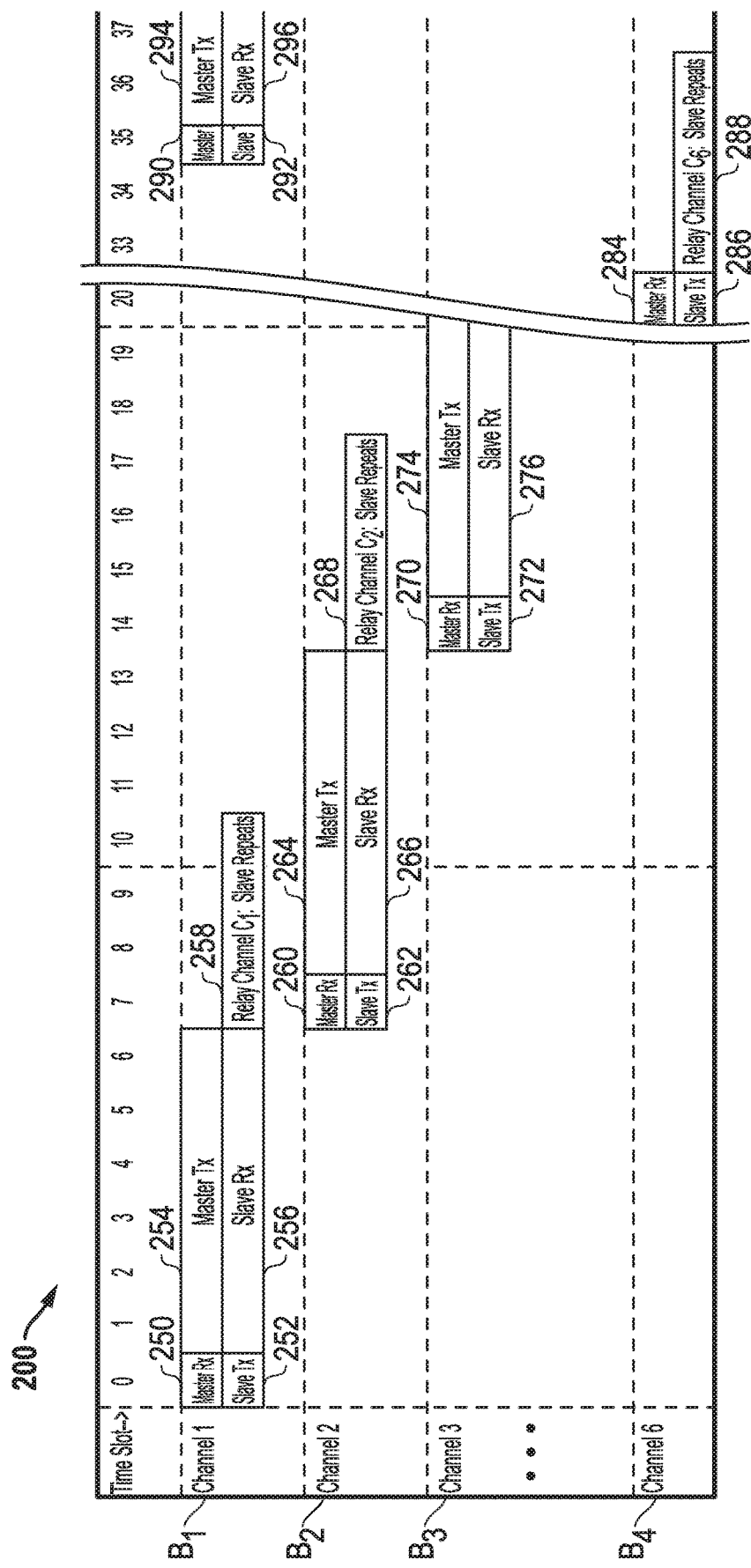
FIG. 8 is a timing diagram of the preferred WADC protocol 200.

Referring now more specifically to FIG. 8, an exemplary timing diagram is provided of the WADC protocol 200 in operation. The master node 210 transmits a command message to Slave Group 1 (SN1 to SN10) on the main channel $B_1$ during time slot 1 (see 254). This is also referred to as the forward link. The master node 210 then retransmit the same command message five additional times to Slave Group 1 on the main channel $B_1$ during time slots 2 to 6 (see 254). During this time, the slave nodes listen on main channel $B_1$ (see 256). Each repeater node (SN1 to SN5) then transmits a relay message (i.e., the command message received at 256) once in its assigned time slots 7 to 10 on main channel $B_1$ (see 258). For example, SN1 transmits the relay message in time slot 7, SN2 transmits in time slot 8, and so on for a total of 4 repeats. The assigned set of time slots on a main channel for transmission of relay messages is also referred to the relay channel C, e.g., relay channel $C_1$ for Slave Group 1's relay messages 258 and relay channel $C_2$ for Slave Group 2's relay messages 268, and so on (see also FIG. 7).

Within each slave group, each node is assigned during provisioning a repeat ID (e.g., 0 through 7, but only 5 expected to be used). The repeat ID value corresponds to the repeat time slot, with zero meaning do not repeat. When a slave node intercepts a command message from the master node, it uses its repeat ID value to determine when it should transmit the relay message if assigned.

If no forward message is received by slave nodes, the slave node stays in receive mode to regain synchronization.

While Slave Group 1 is transmitting the relay messages (254), the master node 210 begins communication with the next slave group, Slave Group 2, on main channel $B_2$. In time slot 7, Slave Group 2 (SN11 to SN20) transmits its monitoring message on main channel $B_2$ (see 262). This is also referred to as the return link. Only a single slave node within a slave group transmits its monitoring message during each return-link time slot (e.g., 252, 262, 272, 286, and 292). The prior command message that was transmitted on the same channel identifies which slave node within a slave group shall initiate the monitoring message. A monitoring message is about $\frac{1}{5}^{th}$ the size of a command message. So, for example, only SN11 would transmit its monitoring message in the first $\frac{1}{5}$ of time slot 7 (262). Repeater nodes SN12 to SN15 (as well the master node) would listen for the monitoring message from the assigned slave node SN11. Then, each of the repeater nodes SN12 to SN15 retransmit SN11's monitoring message sequentially (i.e., one at a time) in the remaining ⅘th of time slot 7.

In the next return link time slot for the same group, the next slave within the slave group transmits its monitoring message. For example, SN1's monitoring message is transmitted and retransmitted during slot 252 and during the next cycle SN2's monitoring message would transmitted and retransmitted during slot 292. The master node 210 listening for and receives the monitoring messages on main channel (see 250, 260, 270, and 290).

In time slots 8 to 13, the master node 210 transmits the command message for Slave Group 2 six times (see 264), which are received by the slave nodes (SN11 to SN20) (see 266), similarly as described above. In time slots 14 to 17, repeater nodes of Slave Group 2 (e.g., SN11 to SN15) repeat the forward message as described above. Similarly for Slave Group 3 on main channel $B_3$, monitoring messages are transmitted and received at time slot 14 (see 272 and 274), command messages are transmitted and received at time slots 12 to 20 (see 274 and 276), and command messages are subsequently repeated by relay nodes (not shown).

The process then repeats sequentially for the remaining slave groups. After transmitting and receiving to and from all of the slave groups (see 284, 286 and 288), the master node cycles through the channels again to receive and transmit messages starting with Slave Group 1 (see 290, 292, 294, and 296).

In the preferred embodiment of the WADC protocol 200, the timing and data structures is as follows. The preferred embodiment of a command message is shown in Table III below.

TABLE III

| Function | Range (Bits) | Comments | Variable (in code) |
| --- | --- | --- | --- |
| Message header | 8 bytes | Includes system ID, message size, frame number, and 802.15.4 control flags | header |
| Command ID | 0-3 (2) | Message type (e.g., control setting, shutdown command) | cmd |
| Repeater timeslot | 0-7 (3) | Which repeater echoed this message | rptSlot |
| Module ID | 0-127 (7) | Which module ID is the next designated responder | deviceId |
| Repeat Message Flag | 0-1 (1) | 1 means message is a repeat | repeatMsg |
| Command data | 30 bytes (240) | 3 bytes of control data for each of up to 10 modules on this channel; the content of this data is variable depending on what is being controlled, e.g., see Table IIIA | |

A preferred embodiment of command data is exemplified for a row control module in Table IIIA below.

TABLE IIIA

| Function | Range (Bits) | Comments | Variable (in code) |
| --- | --- | --- | --- |
| Motor speed MSB | 0-255 (8) | Motor speed setpoint in RPM, MSB | motSpeed1 |
| Motor speed LSB | 0-255 (8) | Motor speed setpoint in RPM, LSB | motSpeed2 |
| Liquid fertilizer | 0-255 (8) | Liquid fertilizer drive duty cycle in % | fertPWMpct |

The return link is initiated by a slave node. The slave node transmits a relatively small monitoring message. The monitoring message is approximately ⅕th of the size of a command message on the forward link, or about 120 bits. A preferred embodiment of a monitoring message is shown below in Table IV.

TABLE IV

| Function | Range (Bits) | Comments | Variable (in code) |
| --- | --- | --- | --- |
| Message header | 8 bytes | Includes system ID, message size, frame number, and 802.15.4 control flags | header |
| Command ID | 0-3 (2) | Command type (e.g., for a planter) | cmd |
| Rx RSSI | 0-7 (3) | Received RSSI levels | rxRssi |
| maxMissedMsg | 0-7 (3) | How many forward link messages has module missed | maxMissedMsg |
| deviceId | 0-127 (7) | Source module ID of this message | deviceId |
| repeatMsg | 0-1 (1) | 1 means message is a repeat | repeatMsg |
| Monitoring data | 6 bytes (48) | 6 bytes of module real-time status data, for example: motor speed, seed count, seed count statistics, etc. | dat |

The master node may cycle through each channel as shown in FIG. 8. Each time slot is preferably approximately 1 millisecond. Thus, it takes approximately 10 milliseconds to receive monitoring messages (1 time slot) and transmit command messages (6 time slots). An entire cycle takes about 60 milliseconds for the forward link. In the preferred embodiment, one node out of ten is selected to respond on every cycle on the return; so, a cycle for the return link occurs about every 600 milliseconds.

As such, the relay messages transmitted by slave nodes are completed before one cycle through the channels by the master node. In certain embodiments, the relay messages for a group may take more time than channel cycling, such as when there are few slave nodes and group or additional repeats are performed. In that case, a pause period is added prior to starting the master node channel cycling to avoid command messages from overlapping relay messages on the same channel.

This protocol provides messaging redundancy both in the master-to-slave node message (in the preferred embodiment there are up to 5 potential links between master and slave group) and to the slave node (in this example there are up to 6 potential links to the end node). Advantageously, the probability of the master or a node missing a message is reduced by the $5^{th}$ or $6^{th}$ power, respectively.

Figure 9A:
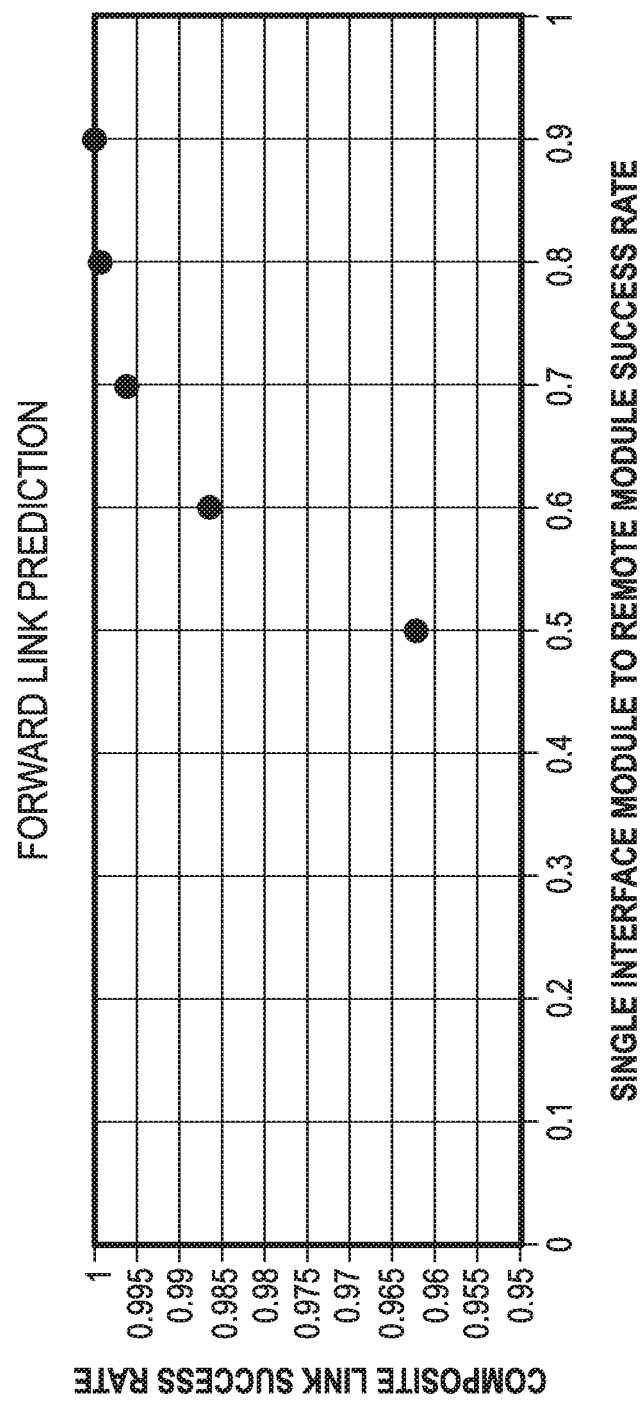
FIG. 9A is a chart showing a calculated composite-link success rate (y-axis) for a given simple-link success rate (x-axis) for a forward link of the WADC protocol 200.
Figure 9B:
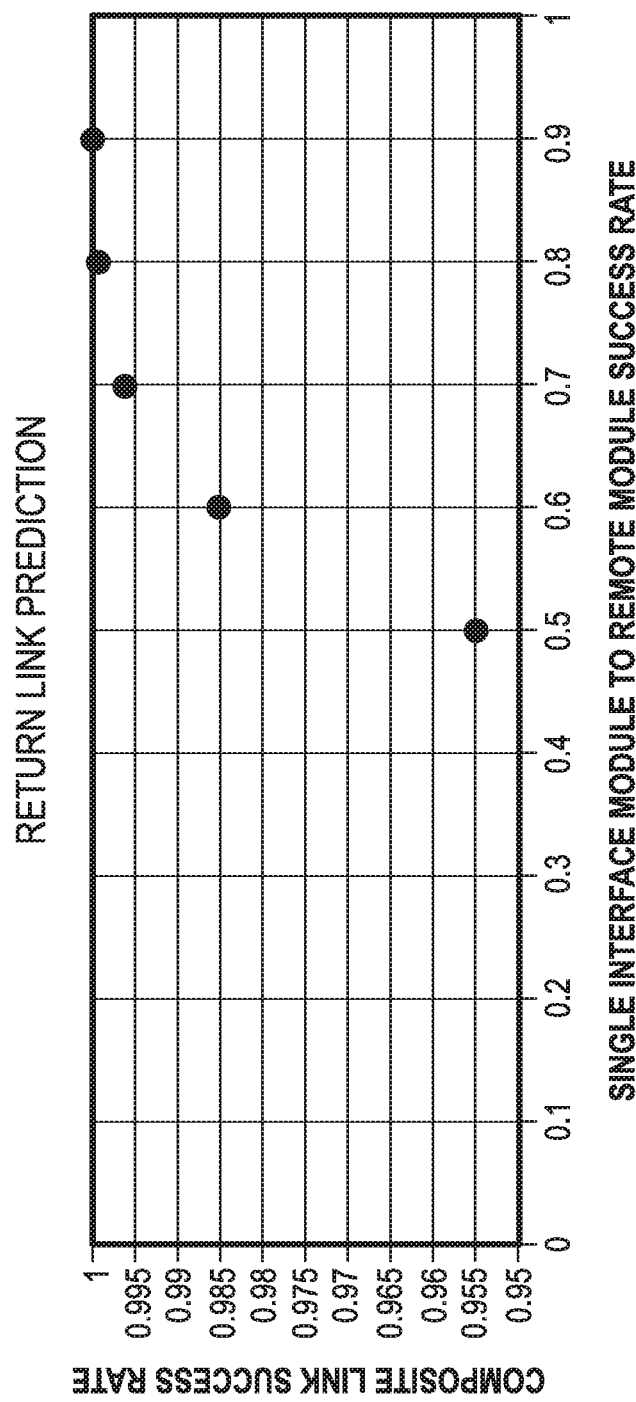
FIG. 9B is a chart showing a calculated composite-link success rate (y-axis) for a given simple-link success rate (x-axis) for a return link of the WADC protocol 200.

Testing in field conditions has shown that the forward link, using a single interface module, has a simple-link reliability success rate of greater than 60% in worst-case installations. That is, if 1000 command messages are sent from the interface module to a remote module without retransmission, over 600 on average are received. The return link had a similar simple-link success rate as the forward link of over 60%. A composite-link reliability for the WADC protocol may be computed. The composite-link reliability for the WADC protocol for the forward link and return link is summarized in FIGS. 9A and 9B, respectively. Shown even at a 60% worst-case installation, the probability of success is estimated to be about 98.5% for a monitoring message and slightly greater for a command message.

It can be appreciated that the message reliability has been increased by a large factor as required for transmitting large amounts of data for precision farming. This advantageously is an improvement in reliability, without additional cost of additional hardware or significant increase in latency. Further, latency is advantageously predictable (e.g., at 60 milliseconds). This allows for commands to be determined based on where the planter will actually be located (e.g., in 60 milliseconds) when a command is applied.

Figure 10:
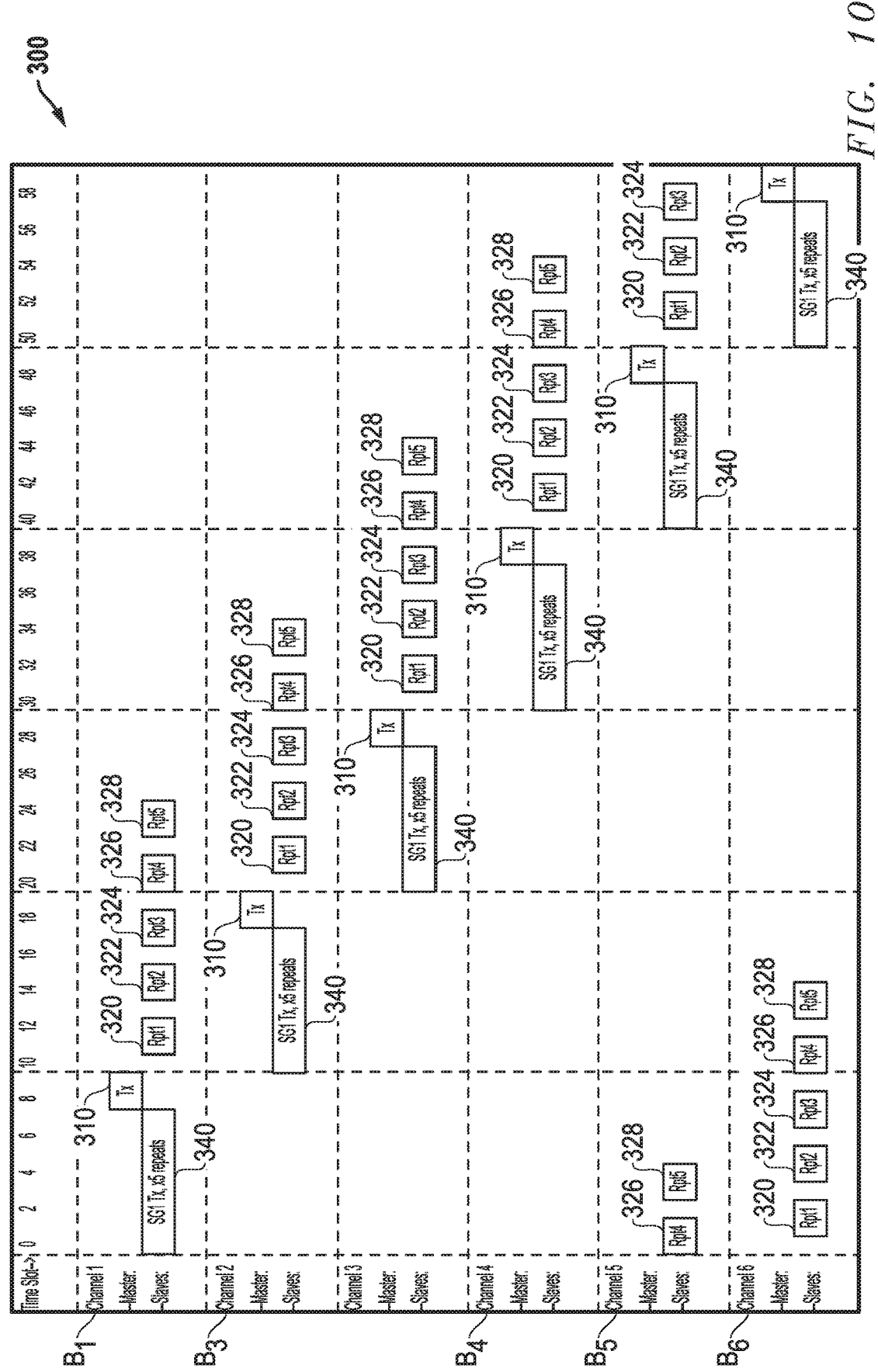
FIG. 10 is a timing diagram of a second preferred WADC protocol 300 in accordance with aspects of the present invention that is adapted for use by the precision agricultural-device control system 100.
Figure 10A:
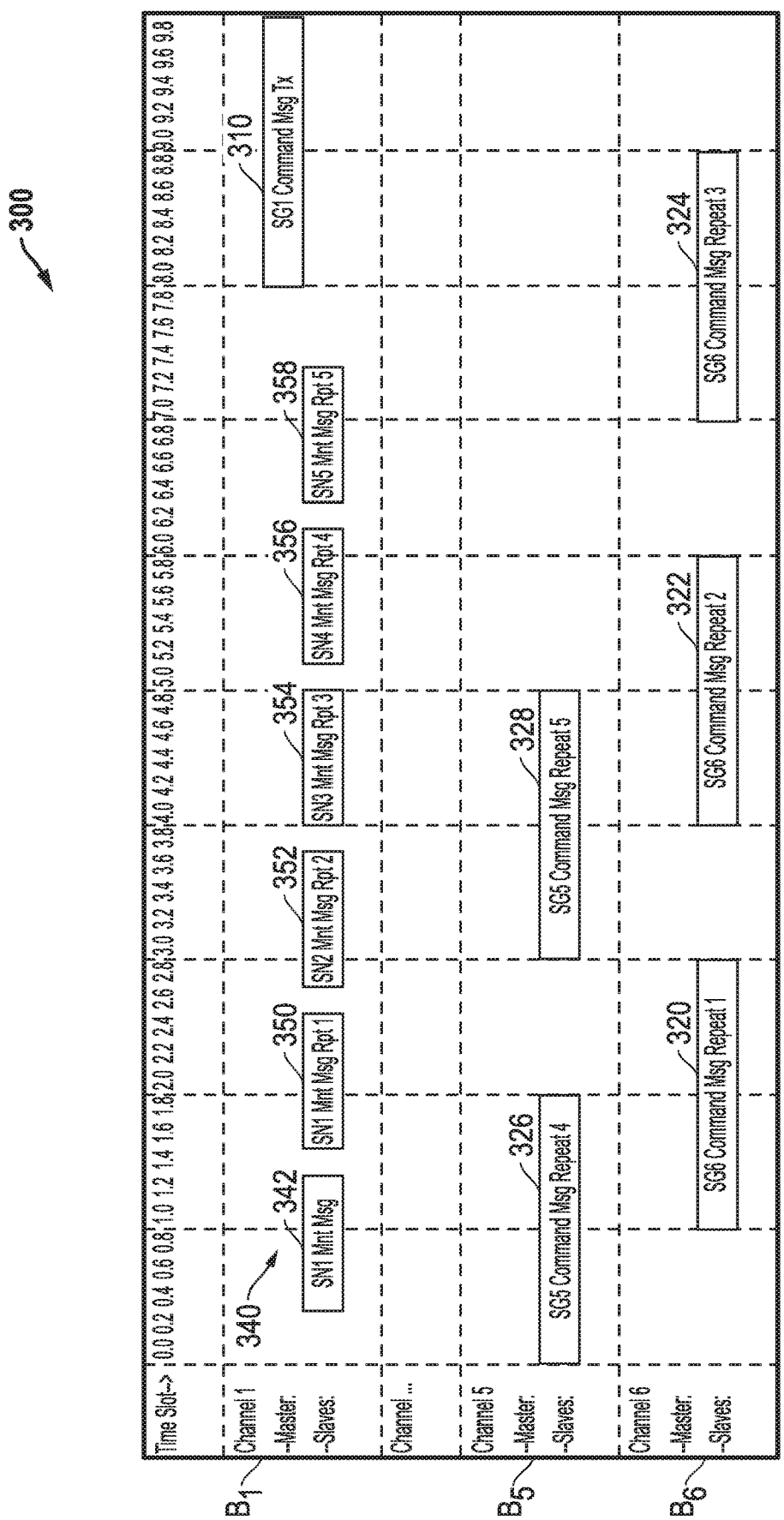
FIG. 10A is an exploded view of certain time slots depicted in FIG. 10.

Referring to FIGS. 10 and 10A, a second preferred embodiment of a WADC protocol 300 is provided. The WADC protocol 300 operates substantially similar to the WADC protocol 200 discussed above except for the timing and relays as discussed below. The WADC protocol 300 is exemplified having 60 slave nodes (SN1 to SN60) grouped into Slave Groups 1 to 6 and each assigned a main channel $B_1$ through $B_6$ (see FIG. 7). Unlike WADC protocol 200, in protocol 300 the master node does not retransmit command messages. Instead, five of ten slave nodes comprising a slave group retransmit the command message 310 for their respective group at the time slot 320, 322, 324, 326, or 328 designated during provisioning (discussed above). Also, a slave node designated to transmit in a particular cycle transmits its monitoring message 340, which is then repeated by slave nodes 350, 352, 354, 356, and 358 that designated during provisioning as repeater nodes. During this time, the master node listens for monitoring messages on the appropriate main channel. Tables V and VI below describe the data structure for the command and monitoring messages, respectively, as used in the WADC protocol 300.

TABLE V

Command Message

| Function | Range (Bits) | Comments | Variable (in code) |
|---|---|---|---|
| Message header | 8 bytes | Includes system ID, message size, frame number, and 802.15.4 control flags | header |
| Command ID | 0-3 (2) | Command type (e.g., for a planter) | cmd |
| Repeater timeslot | 0-7 (3) | Which repeater echoed this message | rptSlot |
| Module ID | 0-127 (7) | Which module ID is the next designated responder | deviceId |
| Repeat Message Flag | 0-1 (1) | 1 means message is a repeat | repeatMsg |
| Command data | 30 bytes (240) | 3 bytes of control data for each of up to 10 modules on this channel; the content | |

TABLE V-continued

Command Message

| Function | Range (Bits) | Comments | Variable (in code) |
|---|---|---|---|
| | | of this data is variable depending on what is being controlled, e.g., see Table IIIA | |

TABLE VI

Monitoring Message

| Function | Range (Bits) | Comments | Variable (in code) |
|---|---|---|---|
| Message header | 8 bytes | Includes system ID, message size, frame number, and 802.15.4 control flags | header |
| Command ID | 0-3 (2) | Command type (e.g., from a planter) | cmd |
| Rx RSSI | 0-7 (3) | Received RSSI levels | rxRssi |
| maxMissedMsg | 0-7 (3) | How many forward link messages has module missed | maxMissedMsg |
| deviceId | 0-127 (7) | Source module ID of this message | deviceId |
| repeatMsg | 0-1 (1) | 1 means message is a repeat | repeatMsg |
| Monitoring data | 6 bytes (48) | 6 bytes of module real-time status data, for example: motor speed, seed count, seed count statistics, etc. | dat |

In accordance with an alternate embodiment of the present invention, the interface module 140 and the command and control module 110 may be combined into a single module. In this embodiment, radio transceivers 122 and 144 are omitted.

The many features and advantages of the invention are apparent from the detailed specification, and thus, it is intended by the appended claim to cover all such features and advantages of the invention which fall within the spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A wireless agricultural-device control system comprising:
   a command and control module, an interface module, and a plurality of remote modules;
   the command and control module comprising:
      a user interface adapted to receive a field prescription,
      a positioning receiver adapted to determine positioning information;
      an agricultural-calculation engine adapted to receive a field prescription and adapted to generate control commands for one or more of the plurality of remote modules based on the field prescription and the positioning information, and a first transceiver adapted to transmit the control commands;

the interface module comprising:
a second transceiver adapted to receive the control commands,
a first processor coupled to the second transceiver, the first processer adapted to generate command messages based on the control commands, and
a third transceiver coupled to the first processor, the third transceiver adapted to wirelessly transmit command messages the plurality of remote modules; and the plurality of remote modules each remote module comprising:
a fourth transceiver adapted to selectively receive the command messages designated for the remote module and adapted to retransmit command messages to another remote module if the remote module has been provisioned as a repeater node, and
a second processor adapted to generate a control signal to an agricultural implement based on the command messages that are designated for the remote module.

2. The wireless agricultural-device control system of claim 1, wherein for each of the plurality of remote modules:
the second processor is adapted to receive a monitoring signal from an agricultural implement and generate a monitoring message; and
the fourth transceiver is adapted to wirelessly transmit the monitoring message to the interface module.

3. The wireless agricultural-device control system of claim 2, wherein the plurality of remote modules are assigned to a plurality of slave groups.

4. The wireless agricultural-device control system of claim 3, wherein each of the remote modules assigned to the same slave group transmit and receive on the same channel, but on a different channel from the remote modules assigned to another slave group.

5. The wireless agricultural-device control system of claim 3, wherein the fourth transceiver of each of the plurality of remote modules is further adapted to receive retransmitted command messages from another remote module assigned to the same slave group.

6. The wireless agricultural-device control system of claim 2, wherein each of the plurality of remote modules is further adapted to receive monitoring messages from another remote module and retransmit the received monitoring messages to the interface module if the remote module is designated as a repeater node.

7. The wireless agricultural-device control system of claim 1 further comprising:
a line planter comprising a plurality of agricultural implements, wherein each of the plurality remote modules is communicatively couple to at least one of the plurality of agricultural implements; and
each of the plurality of agricultural implements is adapted to receive a control signal from the remote module to which it is communicatively coupled.

8. The wireless agricultural-device control system of claim 1 further comprising:
a tractor having a cab, wherein the command and control module is installed in the cab;
the interface module being installed in a location remote from the command and control module;
a line planter comprising a plurality of agricultural implements, wherein each of the plurality remote modules is communicatively couple to at least one of the plurality of agricultural implements; and
each of the plurality of agricultural implements is adapted to receive a control signal from the remote module to which it is communicatively coupled.

9. The wireless agricultural-device control system of claim 1, wherein the command and control module communicates with the interface module using Bluetooth.

10. The wireless agricultural-device control system of claim 1, wherein the command and control module communicates with the interface module using CAN-BUS.

11. The wireless agricultural-device control system of claim 1, wherein the interface module communicates with the plurality of remote modules using a 802.15.4 physical layer protocol.

12. The wireless agricultural-device control system of claim 1, wherein the interface module communicates with the plurality of remote modules using the protocol shown in FIG. 8.

13. The wireless agricultural-device control system of claim 1, wherein the interface module communicates with the plurality of remote modules using the protocol shown in FIGS. 10 and 10A.

14. A method for wireless communication with agricultural implements comprising:
determining a first command message for a first agricultural implement based on a field prescription and a location;
determining a second command message for a second agricultural implement based on a field prescription and a location;
wirelessly transmitting the first command message on a first channel to a first set of remote modules during a first time slot;
wirelessly retransmitting the first command message by a first remote module of the first set of remote modules to another remote module of the first set of remote modules on the first channel during a second time slot;
wirelessly transmitting the second command message on a second channel to a second set of remote modules during the second time slot;
outputting a first control signal to the first agricultural implement by a second remote module of the first set of remote modules based on receiving the first command message; and
outputting a second control signal to the second agricultural implement by a third remote module of the second set of remote modules based on receiving the second command message.

15. The method of claim 14 further comprising:
receiving by the second remote module a monitoring signal from the first agricultural implement;
generating a first monitoring message by the second remote module;
wirelessly transmitting the first monitoring message on the first channel during a third time slot by the second remote module.

16. The method of claim 14 further comprising:
receiving the first monitoring message by the first remote module;
wirelessly retransmitting the first monitoring message to an interface module on the first channel during a fourth time slot by the first remote module.

* * * * *